Patented Apr. 9, 1929.

1,708,330

UNITED STATES PATENT OFFICE.

REGINALD H. ROBINSON AND HENRY HARTMAN, OF CORVALLIS, OREGON; DEDICATED, BY MESNE ASSIGNMENTS, TO THE CITIZENS OF THE UNITED STATES.

PROCESS FOR THE REMOVAL OF RESIDUAL POISONS FROM AND THE PRESERVATION OF FRUITS.

No Drawing.          Application filed May 19, 1927.   Serial No. 192,778.

(GRANTED UNDER THE ACT OF MARCH 3, 1883, AS AMENDED APRIL 30, 1928; 370 O. G. 757.)

This application is made under the act of March 3, 1883, chapter 143 (22 Stat. 625) as amended April 30, 1928 (H. R. 6103) and the invention herein described and claimed may be used by the Government of the United States or any of its officers or employees in the prosecution of work for the Government, or by any citizen of the United States, without payment to us of any royalty thereon.

This invention relates to the use of certain chemicals to remove certain spray residues from deciduous fruits and to destroy the spores of decay producing organisms on the fruit at the time of treatment.

The agent used in the removal of spray residue is a water solution of hydrochloric acid, while the agent or fungicide used to destroy the spores is a water solution of formaldehyde. These agents are effective when used for the purpose intended either combined or separately.

The spray residues in question are such deposits of arsenic, lead, copper, and lime as remain on the fruit from the application of such spray materials as arsenate of lead, arsenate of calcium, calcium hydroxide, etc. The decay producing organisms are those fungous troubles commonly called blue mold, gray mold, brown rot, anthracnose, perennial canker, and such other allied forms as may cause decay of deciduous fruits in storage or in transit.

The deciduous fruits referred to are apples, pears, plums, prunes, cherries, grapes, currants, gooseberries, raspberries, strawberries, blackberries, plumcots, apricots, nectarines, quinces, etc.

The removal of spray residue is made effective by washing the fruit in a water solution of hydrochloric acid, used at such concentrations as will be effective. For most purposes, concentrations from .3 to 2 per cent are optimum. The length of the treatment depends upon such factors as (1) the temperature of the solution, (2) the amount of agitation given, (3) the concentration of the solution, (4) the amount and nature of the residue present, and (5) the amount of wax present on the fruit at the time of treatment. The time required may vary from 10 seconds to 20 minutes. The treatment is effective, either when the fruit is washed by immersion in the solution or when it is subjected to jets of spray as it travels on conveyors. This acid treatment is followed by washing with water to remove the acid, and then by drying of the fruit by natural or artificial means.

The fungicide is made effective by washing the fruit in a solution of formaldehyde, prepared by adding one part of formaldehyde in fifty or one hundred and sixty parts of water or acid solution as the case may be. Following the treatment with formaldehyde, the fruit may or may not be rinsed with water and may be packed or stored either in a wet or dry condition.

We claim:

1. A process for the removal of residual poisons from and preserving fruit comprising the application to such fruit of a mixture of water solutions of hydrochloric acid and formaldehyde.

2. A process for the removal of residual poisons from and preserving fruit comprising the application to such fruit of a mixture of water solutions of hydrochloric acid and formaldehyde, followed by washing of the fruit with water and then by the drying of the fruit.

3. A process for the removal of residual poisons from fruit and the preservation thereof comprising the application to such fruit of a water solution of hydrochloric acid, the washing of the treated fruit to remove such acid, the subjection of the fruit to a bath of water solution of formaldehyde, followed by the drying of the fruit.

REGINALD H. ROBINSON.
HENRY HARTMAN.